United States Patent
Chen et al.

(10) Patent No.: US 8,141,412 B2
(45) Date of Patent: Mar. 27, 2012

(54) METHOD OF DETECTING DRYNESS OF WET STEAM OF A ONCE-THROUGH STEAM INJECTION BOILER AND A DETECTING APPARATUS THEREFOR

(75) Inventors: Baodong Chen, Fushun (CN); Longshe Shen, Fushun (CN); Yongfei Yan, Fushun (CN); Taidong Jin, Fushun (CN)

(73) Assignee: Liaoning Shihua University, Wanghua District, Fushun, Liaoning Province (CN)

( * ) Notice: Subject to any disclaimer, the term of this patent is extended or adjusted under 35 U.S.C. 154(b) by 376 days.

(21) Appl. No.: 12/394,059

(22) Filed: Feb. 27, 2009

(65) Prior Publication Data
US 2009/0217736 A1  Sep. 3, 2009

(30) Foreign Application Priority Data
Feb. 29, 2008 (CN) .......................... 2008 1 0010509

(51) Int. Cl.
G01N 7/00 (2006.01)
(52) U.S. Cl. ...................................... 73/29.01; 73/25.04
(58) Field of Classification Search .............. 73/29.01, 73/25.04
See application file for complete search history.

(56) References Cited

U.S. PATENT DOCUMENTS
4,876,897 A * 10/1989 DeCarlo et al. ............ 73/861.04
5,020,000 A *  5/1991 Carmichael .................. 702/30
7,609,368 B2 * 10/2009 Melnyk .......................... 356/28
2006/0123923 A1 *  6/2006 Dutton et al. ............ 73/861.354

* cited by examiner

*Primary Examiner* — Hezron E Williams
*Assistant Examiner* — Paul West

(57) ABSTRACT

A method of detecting the dryness of wet steam of a once-through steam injection boiler, comprises:
first, by detecting and/or calculating, obtaining volume flow of wet steam, corresponding volume flow of saturated liquid, and corresponding volume flow of saturated vapour; and
then obtaining the dryness of wet steam of the once-through steam injection boiler, X, according to the following relationship equation:

$$X = \frac{Q_s^k - Q_l^k}{Q_v^k - Q_l^k};$$

wherein $Q_s^k$, $Q_l^k$, and $Q_v^k$ are the volume flow of wet steam, the corresponding volume flow of saturated liquid, and the corresponding volume flow of saturated vapour respectively.

A detecting apparatus for detecting dryness of wet steam of a once-through steam injection boiler, specifically comprises: a data detecting module 1, a data processing module 2, and a data displaying module 3, wherein the data processing module 2 connects the data detecting module 1 and the data displaying module 3.

7 Claims, 2 Drawing Sheets

METHOD OF DETECTING DRYNESS OF WET STEAM OF A ONCE-THROUGH STEAM INJECTION BOILER AND A DETECTING APPARATUS THEREFOR

BACKGROUND OF THE PRESENT INVENTION

1. Field of Invention

The present invention relates to the technology of once-through boiler and the related devices, and more particularly to a method of detecting dryness of wet steam of a once-through steam injection boiler and a detecting apparatus therefor.

2. Description of Related Arts

Steam is an important secondary energy, and has been applied widely in industrial production and people's daily life. To further improve the management level of energy, the parameters such as steam dryness should be detected precisely and treated correspondingly.

The dryness of wet steam is an important quality parameter of water vapour. Ordinarily, we define the ratio of the mass of gas phase dry saturated vapour to the total mass of wet steam as the dryness of wet steam. In industrial production, real-time measuring and controlling the dryness of wet steam is necessary.

For example, in the end stages of vanes of a steam turbine, the dryness of steam affects the service life of the vanes of the steam turbine and the efficiency of the steam turbine greatly; on many occasions such as chemical industry, food processing, and pharmacy, the dryness of steam needs real-time detecting and controlling; in thermal oil extraction, the dryness of the high temperature wet steam injected into the oil layer has great effect on the economic efficiency of the oil extraction.

However, there is not an engineering measuring device for the dryness of wet steam at home and abroad, wherein the engineering measuring device is capable of real-time measuring, has high accuracy and long service life, and is cheap and reliable. Therefore researching and developing the measuring technology of the dryness of wet steam and the measuring apparatus therefor has practical meaning.

It is worth emphasizing that, steam stimulation is the leading process technology of heavy oil extraction, the dryness of steam is the main parameter of steam injection process, and increasing the dryness of stem in well bottom is the core question of increasing the economical efficiency of the thermal oil extraction. It is generally admitted that, the higher the dryness of the steam injected into the well is, the more efficiently the energy is utilized, and therefore the better the economic efficiency of the thermal oil extraction is.

Among the prior methods of measuring the dryness of wet steam, some people measure the dryness of the coagulated steam according to the energy conservation principle, others adopt chemical titration method (alkali concentration). According to the traditional boiler technology, detecting the dryness of the steam in the boiler adopts a special detecting method carried out periodically (generally once per hour). The special detecting method has defects that the steps are complicated, the detecting period is too long, the detecting can not be controlled automatically, and the detecting effect is hard to guarantee.

People thirst for a method of detecting dryness of wet steam of a once-through steam injection boiler and a detecting apparatus therefor, which have better technical effect.

SUMMARY OF THE PRESENT INVENTION

An object of the present invention is to provide a method of detecting dryness of wet steam of a once-through steam injection boiler and a corresponding detecting apparatus therefor.

According to one of the definitions of the dryness of water vapour $$X = \frac{v_x - v'}{v'' - v'},$$

wherein $v_x$, $v'$, and $v''$, are the specific volume of wet steam, the specific volume of corresponding saturated liquid, and the specific volume of saturated vapour respectively. Multiplying the numerator and the denominator on the right ride of the equation by the mass flow of the working medium water of the steam injection boiler respectively, there must be a relationship $$X = \frac{\dot{Q}_x - \dot{Q}'}{\dot{Q}'' - \dot{Q}'},$$

wherein $\dot{Q}_x$, $\dot{Q}'$, and $\dot{Q}''$ are the volume flow of wet steam, the corresponding volume flow of saturated liquid, and the corresponding volume flow of saturated vapour respectively.

Accordingly, in order to accomplish the above object, the present invention provides a method of detecting dryness of wet steam of a once-through steam injection boiler, characterized in:

first, by detecting and/or calculating, obtaining volume flow of wet steam, corresponding volume flow of saturated liquid, and corresponding volume flow of saturated vapour; and then obtaining the dryness of wet steam of the once-through steam injection boiler, X, according to the following relationship equation:

$$X = \frac{\dot{Q}_x - \dot{Q}'}{\dot{Q}'' - \dot{Q}'};$$

wherein $\dot{Q}_x$, $\dot{Q}'$, and $\dot{Q}''$ are the volume flow of wet steam, the corresponding volume flow of saturated liquid, and the corresponding volume flow of saturated vapour respectively.

A basic requirement of the present invention is to apply the above mathematic model to actual engineering, and specifically solve complicated technical problems which people desire to solve. Particular application of the mathematic model and particular realizing means in engineering can be changed according to circumstances. The preferred embodiment is described as follows.

The method of detecting dryness of wet steam of a once-through steam injection boiler, is characterized in that: specifically, the method of detecting dryness of wet steam of a once-through steam injection boiler adopts flow method to detect the dryness of wet steam of the once-through steam injection boiler, wherein the flow method comprising:

first, measuring steam pressure of the boiler, steam temperature of the boiler, volume flow or mass flow of feedwater of the boiler, volume flow or mass flow of wet steam of the boiler; and then according to the volume flow or the mass flow of feedwater of the boiler, and the steam pressure or the steam temperature, calculating corresponding volume flow of saturated liquid and corresponding volume flow of saturated vapour, and further calculating the dryness of wet steam of the boiler, X.

The method of detecting dryness of wet steam of a once-through steam injection boiler is preferably embodied as:

first, measuring the following parameters in an inlet of a boiler tube of the once-through boiler and in an outlet of the boiler tube of the once-through boiler: the steam pressure, the steam temperature, the volume flow or the mass flow of feedwater of the boiler, and the volume flow or the mass flow of wet steam of the boiler; and then calculating the corresponding volume flow of saturated liquid and the corresponding volume flow of saturated vapour, and further calculating the dryness of wet steam of the boiler, X.

The method of detecting dryness of wet steam of a once-through steam injection boiler can also be preferably embodied as:

first, obtaining volume flow or mass flow of boiler water and volume flow of wet steam in an outlet of the boiler by detecting, simultaneously detecting saturated pressure and temperature of wet steam at the outlet of the boiler, and calculating the corresponding volume flow of saturated liquid and the corresponding volume flow of saturated vapour according to calculation formula of physical properties of water, and then obtaining the dryness of wet steam of the once-through steam injection boiler, X, according to the following relationship equation:

$$X = \frac{\mathcal{O}_x^k - \mathcal{O}^k}{\mathcal{O}^e - \mathcal{O}^k};$$

wherein $\mathcal{O}_x^k$, $\mathcal{O}^k$, and $\mathcal{O}^e$ are the volume flow of wet steam, the corresponding volume flow of saturated liquid, and the corresponding volume flow of saturated vapour respectively.

The present invention also provides a detecting apparatus for detecting dryness of wet steam of a once-through steam injection boiler, characterized in that: the detecting apparatus for detecting dryness of wet steam of a once-through steam injection boiler comprises: a data detecting module 1, a data processing module 2, and a data displaying module 3, wherein the data processing module 2 connects the data detecting module 1 and the data displaying module 3;

wherein, the data detecting module 1 detects at least a parameter selected from the group consisting of: steam pressure of the boiler, steam temperature of the boiler, volume flow or mass flow of feedwater of the boiler, temperature of feedwater of the boiler, pressure of feedwater of the boiler, and volume flow or mass flow of wet steam;

the data processing module 2 calculates volume flow of saturated liquid and volume flow of saturated vapour corresponding to the wet steam, according to the parameter detected by the data detecting module 1; and simultaneously, the data processing module 2 calculates the dryness of the boiler, X, according to the volume flow of wet steam, and the volume flow of saturated liquid and the volume flow of saturated vapour corresponding to the wet steam calculated above; and the data displaying module 3 displays the dryness of the boiler, X, calculated by the data processing module 2, and/or the parameter detected by the data detecting module 1, and/or the volume flow of saturated liquid and the volume flow of saturated vapour corresponding to the wet steam.

In the detecting apparatus for detecting dryness of wet steam of a once-through steam injection boiler, the data detecting module 1 comprises at least a detecting element selected from the group consisting of: a pressure sensor, a temperature sensor, a volume flow meter, and a mass flow meter.

The detecting apparatus for detecting dryness of wet steam of a once-through steam injection boiler comprises: the data detecting module 1, the data processing module 2, and the data displaying module 3;

wherein the data detecting module 1 comprises various detecting meters and a transformation module of meter data;

wherein the detecting meters comprise: a temperature detecting meter, a pressure detecting meter, and a mass flow or volume flow detecting meter, of water in an inlet of the boiler, and a temperature detecting meter, a pressure detecting meter, and a mass flow or volume flow detecting meter, of wet steam in an outlet of the boiler; and wherein the transformation module of meter data of the data detecting module 1 connects the detecting meters and the data processing module 2 respectively.

According to a preferred embodiment of the present invention, controlling devices such as PLC and/or industrial control computer can be utilized as the kernel.

The method of detecting the dryness of wet steam of a once-through steam injection boiler and the detecting apparatus therefor are capable of obtaining accurate detecting results rapidly (detecting time can be controlled within 2 s), and therefore provide an actual base for developing a large-scale control system, which has real-time controlling function, by utilizing the present invention.

When applying flow method in the method of detecting dryness of a once-through boiler, especially an oil-extraction steam injection boiler, and in the detecting apparatus therefor, the flow method comprises:

detecting steam pressure of the boiler, steam temperature of the boiler, volume flow or mass flow of feedwater of the boiler, and volume flow or mass flow of wet steam; and calculating corresponding volume flow of saturated liquid and corresponding volume flow of saturated vapour, according to the volume flow or mass flow of feedwater of the boiler and steam pressure or steam temperature, and further calculating the dryness of the boiler, X.

The meters adopted by the present invention can be thermal meters used widely. The meters are low cost, safe, and reliable, with clear calculating processes and high calculating speed, and therefore realize fast display of dryness. As a result, the meters can obtain the real-time dryness of the once-through steam injection boiler, and realize closed loop control of the boiler, so as to realize accurate adjusting of running state of the boiler and evidently reduce energy consumed by the boiler. Therefore, the present invention fulfills different requirements of once-through boilers in different environments and boilers of different types.

By further classifying and developing detailed functions, the detecting apparatus for detecting dryness of wet steam of a once-through steam injection boiler possesses the following functions: function of inquiry and analysis of parameters such as dryness; function of real-time display of information such as dryness and pressure; function of displaying and subsequent processing of steam enthalpy at the outlet of the boiler; function of accurate control of parameters such as particular dryness, temperature, and pressure by changing water flow and fire according to specific circumstances.

By utilizing the detecting apparatus for detecting dryness of wet steam of a once-through steam injection boiler, we obtain a whole set of automatic control apparatus of dryness of a once-through steam injection boiler, which consists of a detecting apparatus of dryness of wet steam, an automatic control apparatus of dryness of wet steam, and an executing apparatus. Specifically, the automatic control apparatus of dryness of wet steam has a first end connecting a temperature sensor of feedwater of the boiler, a feedwater transmitter, a differential pressure transmitter and a flow transmitter, and a second end connecting a pressure transmitter, a differential pressure transmitter, an executing apparatus and a fuel flow adjusting valve. Additionally, the automatic control apparatus of dryness of wet steam has a body end connecting an outlet tube via a throttling apparatus, and an extension end connecting a feedwater tube via a throttling apparatus, wherein the body end is closer to the boiler than the extension end. Therefore, stability and safety of the once-through steam injection boiler is enhanced evidently, labour intensity of the operator is reduced, and the economic benefit of the once-through steam injection boiler is increased greatly.

The present invention is technologically advanced. The detecting apparatus of the present invention fulfills security requirement of the once-through steam injection boiler, apparatuses and meters operate stably, calculating processes are clear, and calculating speed is high, so as to realize fast display and corresponding automatic control of the dryness of the once-through steam injection boiler.

These and other objectives, features, and advantages of the present invention will become apparent from the following detailed description, the accompanying drawings, and the appended claims.

DETAILED DESCRIPTION OF THE PREFERRED EMBODIMENT

Figure 1:
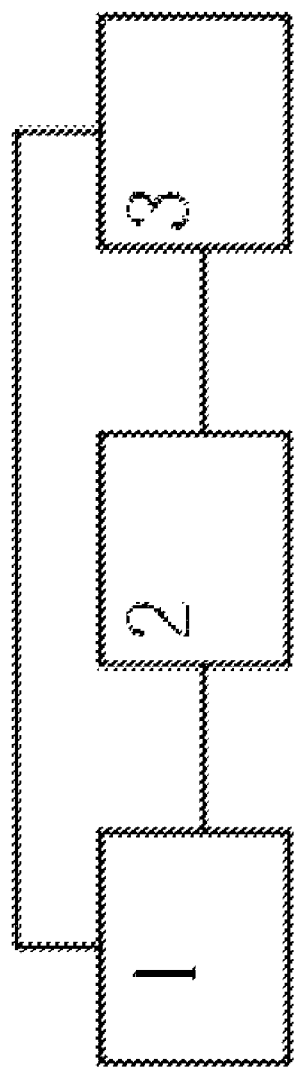
FIG. 1 is a schematic view of structure and principle of a detecting apparatus for detecting dryness of wet steam of a once-through steam injection boiler according to a preferred embodiment of the present invention.
Figure 2:
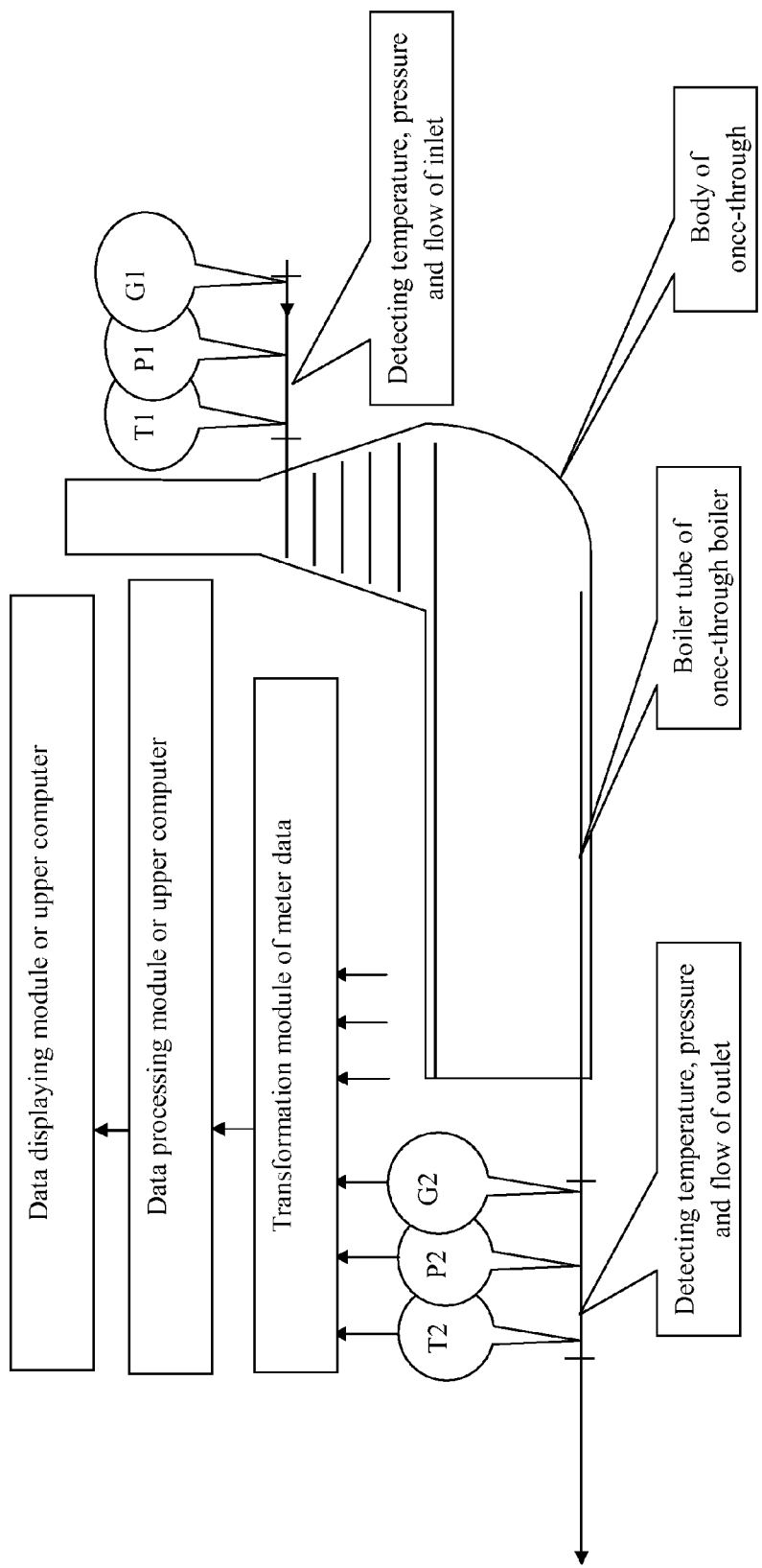
FIG. 2 is a schematic view of application principle of detecting technology of dryness of wet steam of a once-through steam injection boiler according to a preferred embodiment of the present invention.

Referring to FIG. 1 and FIG. 2, the present invention is described below.

Embodiment 1

A Method of Detecting Dryness of Wet Steam of a Once-Through Steam Injection Boiler and a Corresponding Detecting Apparatus Therefor According to one of the definitions of the dryness of wet steam, $$X = \frac{v_x - v'}{v'' - v'},$$

wherein $v_x$, $v'$, and $v''$, are the specific volume of wet steam, the specific volume of corresponding saturated liquid, and the specific volume of saturated vapour respectively. Multiplying the numerator and the denominator on the right ride of the equation by the mass flow of the working medium water of the steam injection boiler respectively, there must be a relationship $$X = \frac{\dot{Q}_x - \dot{Q}'}{\dot{Q}'' - \dot{Q}'},$$

wherein $\dot{Q}_x$, $\dot{Q}'$, and $\dot{Q}''$ are the volume flow of wet steam, the corresponding volume flow of saturated liquid, and the corresponding volume flow of saturated vapour respectively.

The present embodiment provides a method of detecting dryness of wet steam of a once-through steam injection boiler, characterized in:

first, by detecting and/or calculating, obtaining volume flow of wet steam, corresponding volume flow of saturated liquid, and corresponding volume flow of saturated vapour; and then obtaining the dryness of wet steam of the once-through steam injection boiler, X, according to the following relationship equation:

$$X = \frac{\dot{Q}_x - \dot{Q}'}{\dot{Q}'' - \dot{Q}'};$$

wherein $\dot{Q}_x$, $\dot{Q}'$, and $\dot{Q}''$ are the volume flow of wet steam, the corresponding volume flow of saturated liquid, and the corresponding volume flow of saturated vapour respectively.

The method of detecting dryness of wet steam of a once-through steam injection boiler, is characterized in that: specifically, the method of detecting dryness of wet steam of a once-through steam injection boiler adopts a flow method to detect the dryness of wet steam of the once-through steam injection boiler.

Specifically, the method of detecting dryness of wet steam of a once-through steam injection boiler comprises:

first, by utilizing a data detecting module 1, detecting at least a parameter selecting from the group consisting of: steam pressure, steam temperature, volume flow or mass flow of feedwater of the boiler, pressure of feedwater of the boiler, temperature of feedwater of the boiler, and volume flow or mass flow of wet steam, wherein the parameters are in an inlet of a boiler tube of the once-through steam injection boiler and in an outlet of the boiler tube of the once-through steam injection boiler, wherein basic requirement of detecting is that values of $\dot{Q}_x$, $\dot{Q}'$, and $\dot{Q}''$ can be obtained at least, and for further enhancing technical effect, detecting more values and more subsequent data processing is required;

then, by utilizing a data processing module 2 and according to real-time data detected, calculating corresponding volume flow of saturated liquid and corresponding volume flow of saturated vapour, and further calculating the dryness of the boiler, X; and next, displaying related data by a data displaying module 3, and simultaneously, optionally processing various subsequent automatic control actions according to detecting results.

The present embodiment also relates to a detecting apparatus for detecting dryness of wet steam of a once-through steam injection boiler, which is applied to the above detecting process of dryness of wet steam of a once-through steam injection boiler, characterized in that: the detecting apparatus for detecting dryness of wet steam of a once-through steam injection boiler comprises: a data detecting module 1, a data processing module 2, and a data displaying module 3, wherein the data processing module 2 connects the data detecting module 1 and the data displaying module 3;

wherein, the data detecting module 1 detects the following parameters: steam pressure of the boiler, steam temperature of the boiler, volume flow or mass flow of feedwater of the boiler, temperature of feedwater of the boiler, pressure of feedwater of the boiler, and volume flow or mass flow of wet steam;

The data processing module 2 calculates volume flow of saturated liquid and volume flow of saturated vapour corresponding to the wet steam, according to the parameter detected by the data detecting module 1; and simultaneously, the data processing module 2 calculates the dryness of the boiler, X, according to the volume flow of wet steam, and the volume flow of saturated liquid and the volume flow of saturated vapour corresponding to the wet steam calculated above.

The data displaying module 3 displays the dryness of the boiler, X, calculated by the data processing module 2, and/or the parameters detected by the data detecting module 1, and/or the volume flow of saturated liquid and the volume flow of saturated vapour corresponding to the wet steam.

In the detecting apparatus for detecting dryness of wet steam of a once-through steam injection boiler, the data detecting module 1 comprises at least a detecting element selected from the group consisting of: a pressure sensor, a temperature sensor, a volume flow meter, and a mass flow meter.

The detecting apparatus for detecting dryness of wet steam of a once-through steam injection boiler comprises: the data detecting module 1, the data processing module 2, and the data displaying module 3;

wherein the data detecting module 1 comprises various detecting meters and a transformation module of meter data;

wherein the detecting meters comprise: a temperature detecting meter, a pressure detecting meter, and a flow detecting meter, of water in an inlet of the boiler, and a temperature detecting meter, a pressure detecting meter, and a flow detecting meter, of wet steam in an outlet of the boiler; and wherein the transformation module of meter data of the data detecting module 1 connects the detecting meters and the data processing module 2 respectively.

The method of detecting dryness of wet steam of a once-through steam injection boiler and the detecting apparatus therefor are capable of obtaining accurate detecting result rapidly (detecting time can be controlled within 2 s), and therefore provide a reality-base for developing a large-scale control system, which has real-time controlling function, by utilizing the present invention.

When applying flow method in the method of detecting dryness of a once-through boiler, especially an oil extraction steam injection boiler, and in the detecting apparatus therefor, the flow method comprises:

detecting steam pressure of the boiler, steam temperature of the boiler, volume flow or mass flow of feedwater of the boiler, and volume flow or mass flow of wet steam; and calculating corresponding volume flow of saturated liquid and corresponding volume flow of saturated vapour, according to the volume flow or mass flow of feedwater of the boiler and steam pressure or steam temperature, and further calculating the dryness of the oil extraction steam injection boiler, X.

Specific data and calculation process of the present embodiment is below:

utilizing the data detecting module 1 to obtain that at inlet, temperature of water is 20° C., pressure is 11.0 MPa, volume flow of water is 15.812 m³/h; according to temperature of water and pressure detected at the inlet of boiler, and physical properties of water, obtaining specific volume of water: $0.997 \times 10^{-3}$ m³/kg; and thereby calculating mass flow of water: $15.812/(0.997 \times 10^{-3}) = 15859.5$ kg/h;

detecting that at outlet, temperature of wet steam is 310.96° C., pressure is 10 MPa, volume flow of wet steam, $\phi_x = 210.5$ m³/h;

according to physical properties of saturated water and saturated vapour, and temperature or pressure of wet steam at the outlet, obtaining specific volume of saturated liquid, v'=0.0014521 m³/kg, and specific volume of saturated vapour, v"=0.01803 m³/kg; calculating volume flow of saturated liquid and saturated vapour: $\phi' = 0.0014521 \times 15859.5 = 23.03$ m³/h, $\phi'' = 0.01803 \times 15859.5 = 285.94$ m³/h; and according to the mathematic model $$X = \frac{\phi_x - \phi'}{\phi'' - \phi'},$$

calculating as below:

$X = (210.5 - 23.03)/(285.94 - 23.03) = 0.713$, i.e., the corresponding dryness is 0.713.

The meters adopted by the present embodiment can be thermal meters used widely. The meters are low cost, safe, and reliable, with clear calculating process and high calculating speed, and therefore realize fast display of dryness. As a result, the meters can obtain the real-time dryness of the once-through steam injection boiler, and realize closed loop control of the boiler, so as to realize accurate adjusting of running state of the boiler and evidently reduces energy consumed by the boiler. Therefore, the present invention fulfills different requirements of the once-through boiler in different environments and boilers of different types.

By utilizing the detecting apparatus for detecting the dryness of wet steam of a once-through steam injection boiler, we can obtain a whole set of automatic control apparatus of dryness of an wet steam boiler, which consists of a detecting apparatus of dryness of wet steam, an automatic control apparatus of dryness of wet steam, and an executing apparatus. Specifically, the automatic control apparatus of dryness of wet steam has a first end connecting a temperature sensor of feedwater of the boiler, a feedwater transmitter, a differential pressure transmitter and a flow transmitter, and a second end connecting a pressure transmitter, a differential pressure transmitter, an executing apparatus and a fuel flow adjusting valve. Additionally, the automatic control apparatus of dryness of wet steam has a body end connecting an outlet tube via a throttling apparatus, and an extension end connecting a feedwater tube via a throttling apparatus, wherein the body end is closer to the boiler than the extension end. Therefore, stability and safety of the wet steam boiler is enhanced evidently, labour intensity of the operator is reduced, and economic benefit of the wet steam boiler is increased greatly.

Embodiment 2

The present embodiment is essentially similar to the embodiment 1, and the main differences are that:

The method of detecting dryness of wet steam of a once-through steam injection boiler is:

first, obtaining volume flow or mass flow of boiler water and volume flow of wet steam in an outlet of the boiler by detecting, simultaneously detecting saturated pressure and temperature of wet steam at the outlet of the boiler, and calculating the corresponding volume flow of saturated liquid and the corresponding volume flow of saturated vapour according to calculation formula of physical properties of water, and then obtaining the dryness of wet steam of the once-through steam injection boiler, X, according to the following relationship equation:

$$X = \frac{\dot{G}_x - \dot{G}'}{\dot{G}'' - \dot{G}'};$$

wherein $\dot{G}_x$, $\dot{G}'$, and $\dot{G}''$ are the volume flow of wet steam, the corresponding volume flow of saturated liquid, and the corresponding volume flow of saturated vapour respectively.

Specific data and calculation process of the present embodiment are as follows:

utilizing the data detecting module 1 to obtain that at inlet, temperature of water is 20° C., pressure is 18.0 MPa, volume flow of water is 18.0 m³/h; according to temperature of water and pressure detected at the inlet of boiler, and physical properties of water, obtaining specific volume of water: 0.99115×10⁻³ m³/kg; and thereby calculating mass flow of water: 18.0/(0.99115×10⁻³)=18160.7 kg/h;

detecting that at outlet, temperature of wet steam is 365.71° C., pressure is 20 MPa, volume flow of wet steam, $\dot{G}_x$=95.5 m³/h;

according to physical properties of saturated water and saturated vapour, and temperature or pressure of wet steam at the outlet, obtaining specific volume of saturated liquid, v'=0.00204 m³/kg, and specific volume of saturated vapour, v"=0.00585 m³/kg; calculating volume flow of saturated liquid and saturated vapour: $\dot{G}'$=0.00204×18160.7=37.05 m³/h, $\dot{G}''$=0.00585×18160.7=106.24 m³/h; and according to the mathematic model $$X = \frac{\dot{G}_x - \dot{G}'}{\dot{G}'' - \dot{G}'},$$

calculating as below:

X=(95.5−37.05)/(106.24−37.05)=0.8447, i.e., the corresponding dryness is 0.8447.

Embodiment 3

The present embodiment is essentially similar to the embodiment 1, and the main differences are that:

Specific data and calculation process of the present embodiment is below:

utilizing the data detecting module 1 to obtain that at inlet, temperature of water is 20° C., pressure is 8.0 MPa, volume flow of water is 9.0 m³/h; according to temperature of water and pressure detected at the inlet of boiler, and physical properties of water, obtaining specific volume of water: 0.9983×10⁻³ m³/kg; and thereby calculating mass flow of water: 9.0/(0.9983×10⁻³)=9015.3 kg/h;

detecting that at outlet, temperature of wet steam is 299.15° C., pressure is 8.5 MPa, volume flow of wet steam, $\dot{G}_x$=96.6 m³/h;

according to physical properties of saturated liquid and saturated vapour, and temperature or pressure of wet steam at the outlet, obtaining specific volume of saturated liquid, v'=0.0014174 m³/kg, and specific volume of saturated vapour, v"=0.02048 m³/kg; calculating volume flow of saturated liquid and saturated vapour: $\dot{G}'$=0.0014174×9015.3=12.78 m³/h, $\dot{G}''$=0.02048×9015.3=184.63 m³/h; and according to the mathematic model $$X = \frac{\dot{G}_x - \dot{G}'}{\dot{G}'' - \dot{G}'},$$

calculating as below:

X=(96.6−12.78)/(184.63−12.78)=0.488, i.e., the corresponding dryness is 0.488.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of detecting dryness of wet steam of a once-through steam injection boiler, characterized in:
   first, detecting and/or calculating, obtaining volume flow of wet steam, and calculating corresponding volume flow of saturated liquid, and corresponding volume flow of saturated vapour; and
   then obtaining the dryness of wet steam of the once-through steam injection boiler, X, according to the following relationship equation:

$$X = \frac{\dot{G}_x - \dot{G}'}{\dot{G}'' - \dot{G}'};$$

wherein $\dot{G}_x$, $\dot{G}'$, and $\dot{G}''$ are the volume flow of wet steam, the corresponding volume flow of saturated liquid, and the corresponding volume flow of saturated vapour respectively.

2. The method, as recited in claim 1, characterized in that: specifically, the method of detecting dryness of wet steam of a once-through steam injection boiler adopts a flow method to detect the dryness of wet steam of the once-through steam injection boiler,
   wherein the flow method comprises:
   first, measuring steam pressure of the once-through steam injection boiler, steam temperature of the once-through steam injection boiler, volume flow of feedwater of the once-through steam injection boiler, volume flow of wet steam of the once-through steam injection boiler; and
   then according to the volume flow of feedwater of the once-through steam injection boiler, and the steam pressure or the steam temperature, calculating corresponding volume flow of saturated liquid and corresponding volume flow of saturated vapour, and further calculating the dryness of wet steam of the once-through steam injection boiler, X.

3. The method, as recited in claim 2, characterized in that: the method of detecting dryness of wet steam of a once-through steam injection boiler is:

first, measuring the following parameters in an inlet of a boiler tube of the once-through steam injection boiler: the pressure, the temperature, the volume flow feedwater of the once-through steam injection boiler, and measuring the following parameters in an outlet of the boiler tube of the once-through steam infection boiler: the steam pressure, the steam temperature, the volume flow of wet steam of the once-through steam injection boiler; and then calculating the corresponding volume flow of saturated liquid and the corresponding volume flow of saturated vapour, and further calculating the dryness of wet steam of the once-through steam injection boiler, X.

4. The method, as recited in claim 1, characterized in that: the method of detecting dryness of wet steam of a once-through steam injection boiler is:

first, obtaining volume flow of boiler water, volume flow of wet steam in an outlet of the once-through steam injection boiler by detecting, temperature of feedwater of the once-through steam injection boiler, and pressure of feedwater of the once-through steam injection boiler, simultaneously detecting saturated pressure and temperature of wet steam at the outlet of the once-through steam injection boiler, and calculating the corresponding volume flow of saturated liquid and the corresponding volume flow of saturated vapour according to calculation formula of physical properties of water, and then obtaining the dryness of wet steam of the once-through steam injection boiler, X, according to the following relationship equation:

$$X = \frac{\dot{G}_x - \dot{G}'}{\dot{G}'' - \dot{G}'};$$

wherein $\dot{G}_x$, $\dot{G}'$, and $\dot{G}''$ are the volume flow of wet steam, the corresponding volume flow of saturated liquid, and the corresponding volume flow of saturated vapour respectively.

5. A detecting apparatus for detecting dryness of wet steam of a once-through steam injection boiler, characterized in that: the detecting apparatus for detecting dryness of wet steam of a once-through steam injection boiler comprises: a data detecting module, a data processing module, and a data displaying module, wherein said data processing module connects said data detecting module and said data displaying module;

wherein, said data detecting module detects at least a parameter selected from the group consisting of: steam pressure of the boiler, steam temperature of the boiler, volume flow of feedwater of the boiler, temperature of feedwater of the boiler, pressure of feedwater of the boiler, and volume flow of wet steam;

said data processing module calculates volume flow of saturated liquid and volume flow of saturated vapour corresponding to the wet steam, according to the parameter detected by said data detecting module; and simultaneously, said data processing module calculates the dryness of the boiler, X, according to the volume flow of wet steam, and the volume flow of saturated liquid and the volume flow of saturated vapour corresponding to the wet steam calculated above; and said data displaying module displays the following values: the dryness of the boiler, X, calculated by said data processing module, and/or the parameter detected by said data detecting module, and/or the volume flow of saturated liquid and the volume flow of saturated vapour corresponding to the wet steam.

6. The detecting apparatus, as recited in claim 5, characterized in that: said data detecting module of the detecting apparatus for detecting dryness of wet steam of a once-through steam injection boiler, comprises at least a detecting element selected from the group consisting of: a pressure sensor, a temperature sensor, a volume flow meter, and a mass flow meter.

7. The detecting apparatus, as recited in claim 5, characterized in that: the detecting apparatus for detecting dryness of wet steam of a once-through steam injection boiler comprises: said data detecting module, said data processing module, and said data displaying module;

wherein said data detecting module comprises various detecting meters and a transformation module of meter data;

wherein said detecting meters comprise: a temperature detecting meter, a pressure detecting meter, and a mass flow or volume flow detecting meter, of water in an inlet of the boiler, and a temperature detecting meter, a pressure detecting meter, and a mass flow or volume flow detecting meter, of wet steam in an outlet of the boiler; and wherein said transformation module of meter data of said data detecting module connects said detecting meters and said data processing module respectively.

* * * * *